United States Patent [19]

Gidner

[11] 4,217,921
[45] Aug. 19, 1980

[54] BACK FLOW PREVENTER VALVE

[75] Inventor: Robert R. Gidner, Fairview, Pa.

[73] Assignee: Zurn Industries, Inc., Erie, Pa.

[21] Appl. No.: 916,241

[22] Filed: Jun. 16, 1978

[51] Int. Cl.$^3$ .............................................. F16K 24/00
[52] U.S. Cl. ....................................... 137/218; 137/102;
137/853; 137/512.15; 137/512.4; 137/516.25
[58] Field of Search ................ 137/512, 512.1, 512.15,
137/512.4, 516.25, 853, 102, 218

[56] References Cited

U.S. PATENT DOCUMENTS

| 1,695,586 | 12/1928 | Halleck | 137/512 |
|---|---|---|---|
| 2,015,915 | 10/1935 | Adsit | 137/512 |
| 2,322,631 | 6/1943 | Groeniger | 137/218 |
| 2,941,541 | 6/1960 | Peras | 137/102 |
| 3,342,208 | 9/1967 | Steffes | 137/853 |
| 3,448,766 | 6/1969 | Schüle | 137/853 |
| 3,476,142 | 11/1969 | Schultz | 137/512 |
| 3,599,657 | 8/1971 | Maldaus | 137/512 |
| 3,850,190 | 11/1974 | Carlson | 137/218 |
| 3,902,516 | 9/1975 | Rudolph | 137/512 |
| 3,952,766 | 4/1976 | Johnson | 137/512.4 |

FOREIGN PATENT DOCUMENTS

| 541372 | 7/1922 | France | 137/512 |
|---|---|---|---|
| 96913 | 7/1957 | Norway | 137/102 |
| 372932 | 7/1959 | Switzerland | 137/218 |
| 791005 | 2/1958 | United Kingdom | 137/102 |
| 1034759 | 7/1966 | United Kingdom | 137/102 |

Primary Examiner—William R. Cline
Assistant Examiner—H. Jay Spiegel
Attorney, Agent, or Firm—Webb, Burden, Robinson & Webb

[57] ABSTRACT

This invention relates to an in-line back flow preventer valve for fluid supply lines of the reduced pressure zone type. The valve body has an inlet means and a discharge means for liquid flow therethrough. A first chamber, within the valve body, is in liquid communication with the valve inlet, with the first chamber having at least one outlet positioned in the periphery thereof. At the outer periphery of the first chamber is a first flexible member which is adapted to seal the peripheral outlet through elastic pressure under the static or back flow pressure condition within the valve. A second chamber commonly referred to as a reduced pressure zone is positioned outside the first chamber and has at least one outlet in the periphery thereof. Mounted at the outer periphery of the second chamber is a second flexible member adapted to seal the peripheral opening through elastic pressure when the valve is under the back flow or static pressure condition. The second flexible member is further adapted to allow liquid flow communication between the second chamber and the discharge means through the peripheral outlet during forward liquid flow within the valve.

12 Claims, 4 Drawing Figures

BACK FLOW PREVENTER VALVE

BACKGROUND OF THE INVENTION

1. Field of the Invention

This invention relates to back flow preventer valves, and more particularly, to in-line back flow preventer valves of the reduced pressure zone type for liquid systems.

2. Description of the Prior Art

In industrial and residential water supply lines, back flow of contaminated water into the supply lines presents problems under variable water pressure conditions. Because this problem particularly affects the health of communities, there are established criterion for the design and performance of back flow preventer valves. These performance requirements are described in the *American Society of Sanitary Engineering Standard No. 1013* issued June 1971, and also in the *Manual of Cross-Connection Control* published by the Foundation for Cross-Connection and Hydraulic Research.

When used herein, "back flow" means and includes both "back pressure back flow" which is a reversal of the normal direction of flow in the pipeline due to a condition which causes the pressure in the system being supplied to become greater than that in the supply line, the system pressure being always above atmospheric; and "back siphonage back flow" which is a reversal of the normal direction of flow in the pipeline due to a negative pressure (vacuum) being created in a supply line with the back flow source subject to atmospheric or higher pressure.

In contending with the back flow problem, many back flow preventer valves have been proposed and used with the design based primarily on conventional valving systems including springs, stems associated with the springs, diaphragms and circular surfaced mating valve seals. Exemplary of such devices are those shown in U.S. Pat. Nos. 2,372,940; 2,491,604; 3,114,382; 3,173,439; 3,286,722; 3,636,968; 3,724,487; 3,747,621; 3,868,962; 3,905,382; and 3,906,987. In addition to those back flow preventer valves there are one way valves and check valves which use similar structures as flow restricting means under flow reversal conditions. Exemplary of such valves are those shown in U.S. Pat. Nos. 2,746,477 and 2,620,816. Further, elastomeric check valves have been proposed which involve the mating of elastomeric surfaces utilizing their deformable characteristics. Exemplary of such check valves are U.S. Pat. Nos. 2,328,382; 2,270,737; and 3,952,766.

Another problem associated with back flow preventer valves is related to their maintenance and access. The several mechanical parts including springs, seals, etc., require excessive maintenance time in replacing worn or damaged parts. During the normal course of valve operation those parts which are subject to wear, such as valve stems, valve seats and springs, must be replaced at certain intervals to insure effectiveness of the back flow valve.

In accordance with the present invention, a back flow preventer valve is provided which uses no mechanically moving parts, such as springs and valve stems, and is easily assembled and disassembled for the replacement of parts worn during the normal course of operation. In addition, the present invention provides a back flow preventer which permits easy access to the internal parts thereof without the necessity of removing the device from the pipeline or disassembling the pipeline.

Further in accordance with the present invention, a back flow preventer valve is provided with a minimal number of parts in an uncomplicated arrangement which minimizes the chance for malfunction of the device.

BRIEF DESCRIPTION OF THE INVENTION

An in-line back flow preventer valve is provided for fluid supply lines. The valve body has an inlet means and a discharge means for liquid flow therethrough. A first chamber, within the valve body is in liquid communication with the inlet valve, with the first chamber having at least one outlet positioned in the periphery thereof. At the outer periphery of the first chamber is a first flexible member which is adapted to seal the peripheral outlet of the first chamber through elastic pressure under static or back flow pressure conditions within the valve. A second chamber, commonly referred to as the reduced pressure zone, is positioned outside the first chamber and has at least one outlet in the periphery thereof. Mounted at the outer periphery of the second chamber is a second flexible member adapted to seal the peripheral opening through elastic pressure under back flow or static pressure conditions. The second flexible member is further adapted to allow liquid flow communication between the second chamber and the discharge means through the peripheral outlet during forward liquid flow within the valve.

DETAILED DESCRIPTION OF THE INVENTION

In a preferred embodiment of the invention, a first chamber is defined by a rigid truncated cone, preferably constructed of a metal such as brass, cast iron or the like, or of a plastic such as polyvinylchloride, high density polyolefin, acrylonitrile-butadiene-styrene copolymer or a plastic having similar characteristics. A plurality of outlet grooves is cut into the cone defining the first chamber and is coaxial therewith. The interior of the first chamber is in liquid communication with the inlet to the valve. Concentrically arranged with the truncated cone defining the first chamber, and mounted opposing the cone base, is an elastomeric sleeve having the same general configuration as the outer periphery of the plastic cone when mounted thereon. Preferably, the elastomeric sleeve is more acutely angled than the cone to impart elastic pressure over the openings from the first chamber and is most preferably right circular cylindrical; thus, sealing the first chamber when the valve interior is under static or back flow conditions. The second chamber or reduced pressure zone is outside and concentric with the first chamber and defined by a second truncated cone.

The second truncated cone is also provided with a plurality of longitudinal coaxial slots therein to provide an outlet from the interior of the valve to the discharge means. A second elastomeric sleeve is concentrically positioned and in sealing relationship to the outer periphery of the second cone in an analogous manner as the first cone is to the first elastomeric sleeve, except that it is mounted collateral with the base of the second cone. The first elastomeric sleeve is either more acutely angled than the second elastomeric sleeve in relationship to the inner cone or is of a more rigid elastomeric material whereby more liquid flow pressure is required to disengage the first elastomeric seal from the first cone than is required to disengage the second elastomeric sleeve from the second cone.

It is to be understood throughout, that "elastomer" or "elastomeric" means and refers to a natural or synthetic rubber which can be stretched and return to its original dimensions upon the release of the stretching force applied.

In accordance with the present invention, any elastomer may be used to form the elastomeric sleeves provided it has chemical resistance to the liquid used in the system and maintains the proper elasticity under operating parameters. When used in connection with water systems the elastomeric sleeves should be constructed of an elastomer having a durometer hardness (ASTM D 412) of 30 to 100, and preferably, 35 to 80, and most preferably, 35 to 50. Either natural or synthetic polyisoprene elastomers have been found to be useful and are preferred although other elastomers with the requisite properties may be used.

In a most preferred embodiment of the invention, an atmospheric vent is provided from the second chamber. A sealing surface is positioned within the second chamber and is adapted to engage the first flexible member to seal liquid flow communication to the atmospheric vent prior to forward flow of the liquid from the first chamber to the second chamber. Thus, the first flexible member separates from the first chamber proximate the openings but remains in sealing engagement with the first chamber until the vent seal is established. The sealing surface within the second chamber is provided on a third truncated cone, coaxial with the first and second cones and in permanent sealing relationship with the second cone to define the second chamber. This third cone has at least one outlet therein by way of longitudinal coaxial slots which are in liquid flow communication with the atmospheric vent under back flow conditions within the valve. A third chamber is provided with boundaries defined by the periphery of the atmospheric vent and the juxtaposed exterior portions of the second and third cones.

The following drawings will more fully illustrate the operation and construction of the valve in accordance with the present invention and are presented by way of illustration rather than limitation.

DETAILED DESCRIPTION OF THE DRAWINGS

Figure 1:
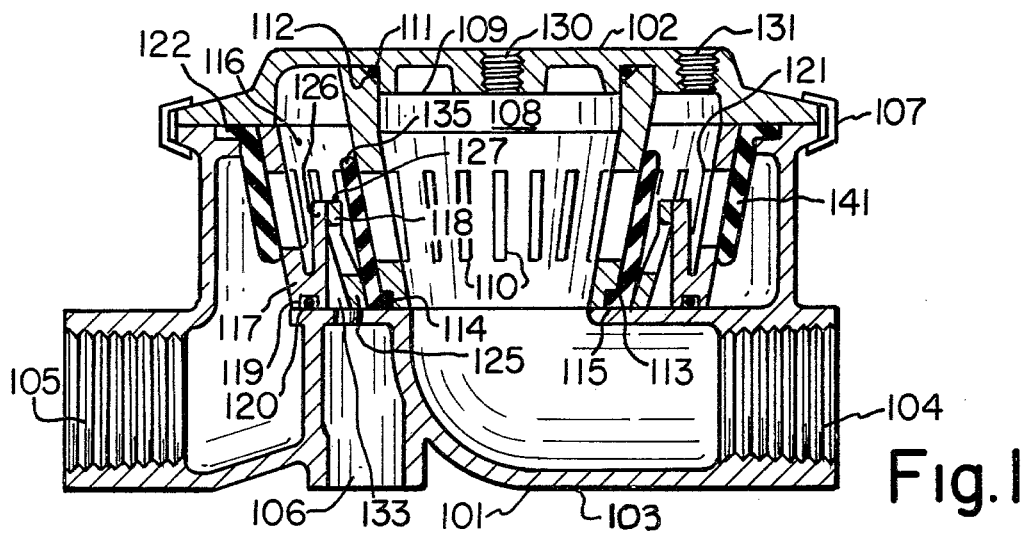
FIG. 1 is a cross section of a valve in accordance with the invention under static or back pressure conditions.

Referring now to the drawings wherein like reference numerals designate like parts, the back flow preventer valve housing 101 is constructed of bronze, cast iron, plastic or a similar material. The housing 101 has a cover plate 102 and a housing body 103. Formed within the housing body 103 is an inlet 104 and an outlet 105 adapted for normal fluid flow from the inlet to the outlet. The body 103 has integrally formed therewith a vent 106 to atmospheric pressure. The removable cover 102 and body 103 are held together by clamp 107 which is preferably a split ring fastener which compresses the cover and body together in liquid sealing engagement. In the alternative to clamp 107 the cover 102 may be attached to body 103 by bolts (not shown) around the flanged periphery thereof. The interior chamber 108 is bounded by cone 109 which is constructed of a metal such as brass or cast iron, or of a plastic material such as acrylonitrile-butadiene-styrene copolymer, high density polyolefin, polyvinylchloride or the like. A plurality of longitudinal slots 110 are formed within truncated cone 109 to permit liquid flow from chamber 108 eventually to outlet 105 under forward flow conditions. Cone 109, near the base thereof, engages the interior of cover 102 and is in liquid sealing communication therewith by the interposition of O-ring 111 with cover 102 and bevelled edge 112 of cone 109.

The first elastomeric sleeve 113 is mounted coaxially and is of the same general shape, but of shorter axial length, as cone 109 in the mounted position. However, flexible member 113 is more acutely angled than cone 109 to impart the desired elastic sealing pressure, thereby sealing the openings 110 in cone 109. In this embodiment of the invention the first elastomeric sleeve is right circular cylindrical. First elastomeric sleeve 113 is further provided with a lip 114 which engages the bottom portion of cone 109 and the valve body at marginal portion 115 to provide the liquid sealing of chamber 108. In other words, sleeve 113 functions both as a flexible valve and a stationary seal.

Figure 4:
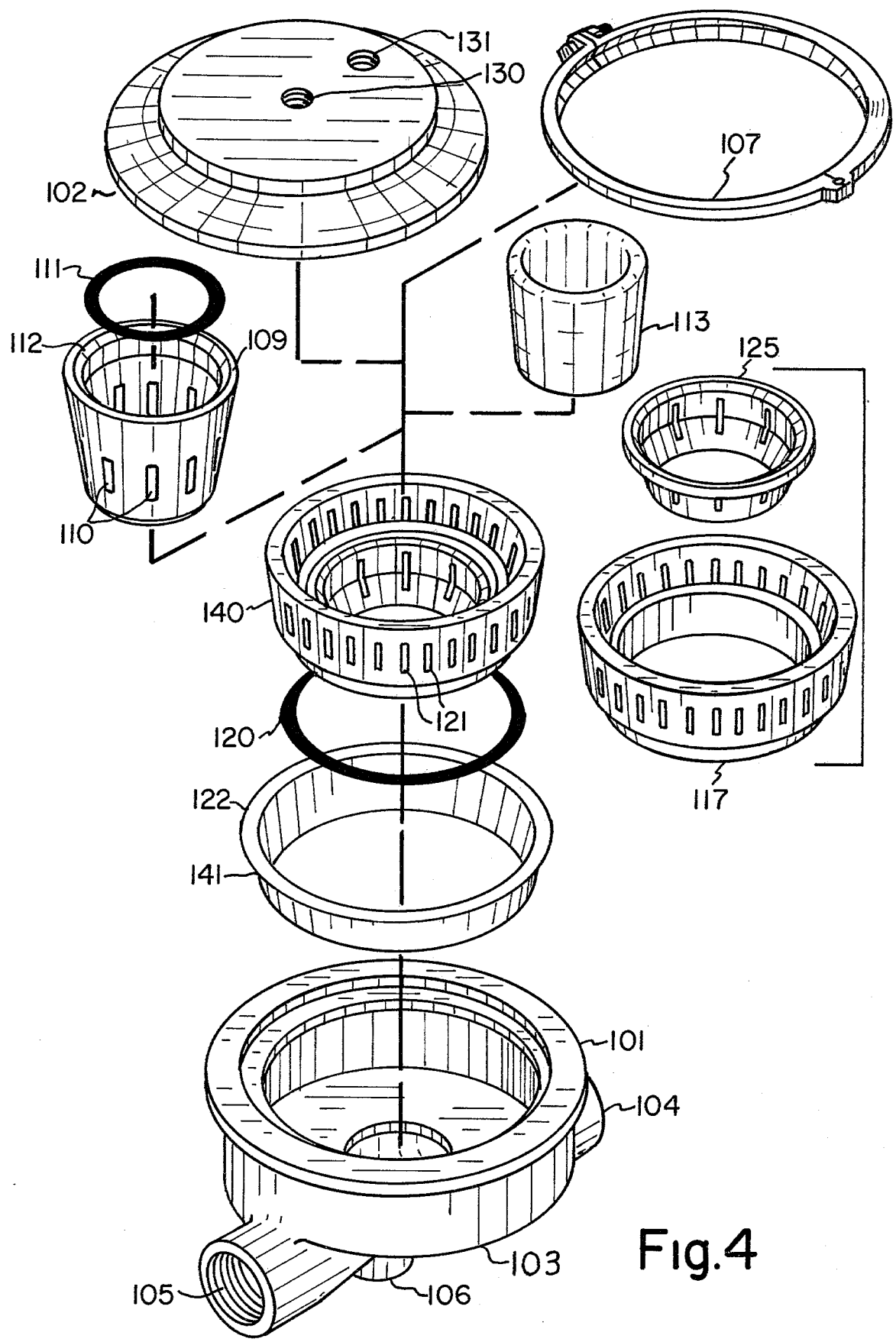
FIG. 4 is a perspective exploded view of the valve of FIG. 1 showing the assembly sequence therefor.

The second chamber 116 which is commonly referred to as the reduced pressure zone is defined by the exterior of cone 109, the interior configuration of second cone 117, the interior of third cone 125 and the outer annular interior of cover 102. The second cone 117 is generally concentric with first cone 109 and is constructed of a similar or the same material. The extension 126 of second cone 117 is in liquid sealing engagement with marginal edge 127 of third cone 125. The second cone 117 and the third cone 125 may be brazed, welded or glued together (depending upon their material of construction) about marginal edge 127 to impart the sealing engagement. Alternatively, as is shown in FIG. 4, cone 117 and 125 may be integrally formed to provide a single structure 140. Third cone 125 has sealing surface 118 for contact with first elastomeric sleeve 113 when there is forward flow through the back flow preventer valve. Second cone 117 is provided with a lip 119 and fitted with an O-ring 120 for sealing engagement with valve body 103 when the valve is assembled. Second cone 117 is provided with longitudinal grooves 121 which are generally coaxial with the axis of the cone 117, to provide an outlet from the valve's second chamber 116 to the valve discharge means 105 under the forward flow condition.

The second elastomeric sleeve 141 is of approximately the same configuration as the cone 117 except that it is more acutely angled and is related to the second cone as in much the same manner as the first elastomeric sleeve is related to the first cone except that it is mounted coaxial with the base of the second cone and of shorter axial length. However, the first elastomeric sleeve is either of a more rigid elastomeric material than the second elastomeric sleeve or it is more acutely angled with respect to its respective cone than the second elastomeric sleeve. This relationship provides that more pressure must be imparted to transfer fluid from the first chamber to the reduced pressure zone than is required to transfer fluid from the reduced pressure zone to the outlet chamber.

Second elastomeric sleeve 141 has a lip 122 which imparts sealing engagement between second cone 117, the cover 102 and the valve body 103.

Threaded portholes 130 and 131 are provided for the insertion of pressure gauges to read the pressure within the various valve chambers to satisfy the periodic testing requirements of local water departments, governmental agencies and the like.

Referring now specifically to FIG. 1 which shows the operational characteristics of the back flow preventer valve under static or back pressure conditions, the cones 109 and 117 have secured to the opening thereof flexible members 113 and 141 preventing any fluid back flow from outlet 105 to inlet 104. Under static conditions this flow prevention is provided solely by the elastic force inherent in the respective elastomeric sleeves and their angular disposition in relation to their respective cones. Under the back pressure condition not only does the elastic force upon the cones seal the openings, but also the hydraulic force imparted by the liquid back flow pressure.

Figure 3:
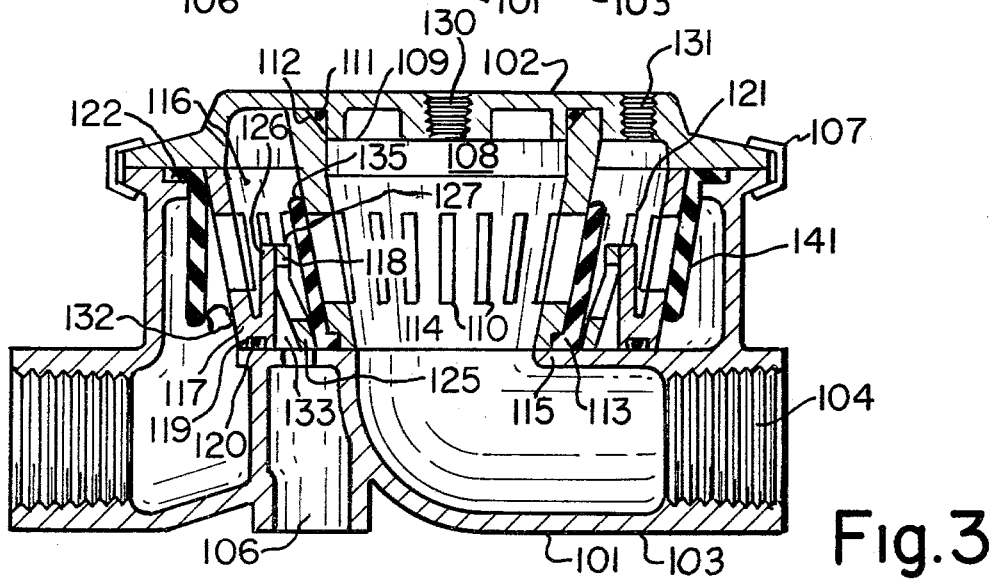
FIG. 3 is the valve of FIG. 1 with the exterior check valve malfunctioning.

Referring now to FIG. 3, the back flow preventer valve is shown wherein particulate contamination 132 is preventing the second flexible member 141 from engaging its respective cone. Under these conditions the path of fluid flow is from outlet 105 and through openings 121 in cone 127 into third annular chamber 133 and finally into atmospheric vent 106. Because the first flexible member 113 is in secure engagement over openings 110, it is disengaged with sealing surface 118 of the third cone thereby providing an opening to atmospheric vent 106 for back flow disposal. This arrangement prevents any back flow from entering inlet 104. It is to be noted that the inverse relationship of the two flexible members with their respective cones provides liquid flow through a fouled exterior valve to the atmospheric vent with a flow path lower than the upper portion of sealing lip 135 on the first flexible member. Thus, even in the unlikely event that the valving function of both members 131 and 113 were fouled under back flow conditions, the liquid would drain through the lower flow path provided by atmospheric vent 106 and not through chamber 108 to inlet 104.

Figure 2:
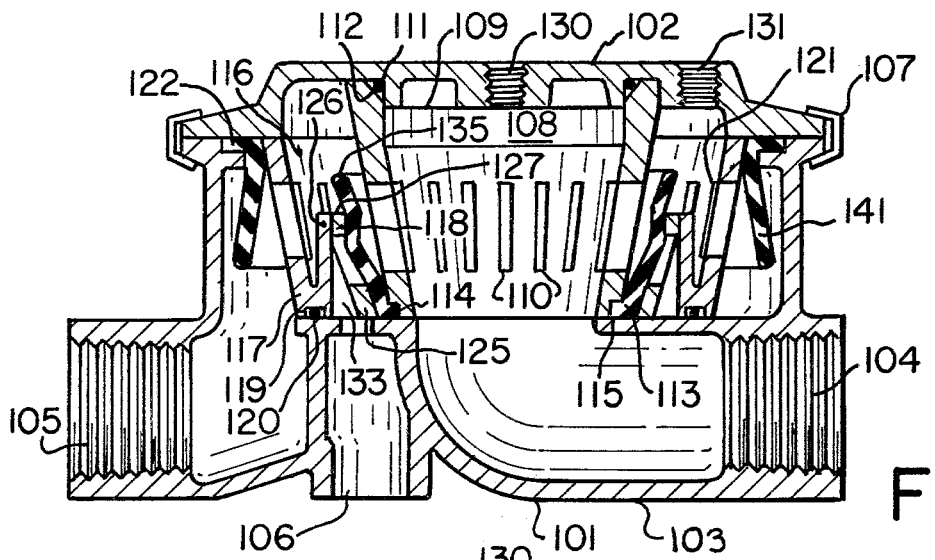
FIG. 2 is the valve of FIG. 1 under normal forward flow conditions.

Referring now to FIG. 2, the back flow preventer is shown under conditions where normal forward flow is established. The fluid enters inlet 104 and chamber 108. The forward flow pressure will cause the first elastomeric sleeve 113 to become spaced apart from the outlets 110 and engage sealing surface 118 of the third cone prior to the disengagement of the sealing lip 135 on cone 113 to allow the fluid to flow into the reduced pressure zone or chamber 116. This engaging and disengaging sequence prevents inlet fluid from traveling into annular chamber 133 and out atmospheric vent 106. In this embodiment the first elastomeric sleeve separates from cone 109 when forward flow pressure is a minimum of 2 psig greater than the pressure in chamber 116 as required by industry standards. Upon sufficient pressure within second chamber 116, normally 1 psig greater than the back pressure from outlet 105, elastomeric sleeve 141 disengages from cone 117 and allows passage of fluid from chamber 116 through outlets 110 in cone 117 and through discharge means 105. First elastomeric sleeve 113 will engage sealing surface 118 of the third cone and, hence, will not vent the interior of the reduced pressure zone 116 to the atmosphere when the pressure in chamber 116 is 2 psig less than the supply pressure at inlet 104, as is required by industry standards.

Thus, the present invention provides a back flow preventer operable under conditions of forward flow, static pressure or back flow conditions with double sealing capability and a provision for draining off back flow fluid when the outermost valve is fouled. Further, simplicity of construction and maintenance of the valve of the invention over prior art valves has been demonstrated by the specific embodiment described herein.

Although the invention has been described and illustrated by way of specific structural features, the invention is not to be limited except so far as is set forth in the accompanying claims.

I claim:

1. A back flow preventer valve comprising:
   (a) a valve body;
   (b) an inlet means in said valve body adapted for communication with a liquid source;
   (c) a discharge means in said valve body adapted to dispense liquid;
   (d) a first chamber in fluid communication with said inlet means;
   (e) at least one outlet from said first chamber formed in the periphery thereof;
   (f) a first flexible member mounted at the outer periphery of said first chamber and adapted to seal said peripheral opening through elastic pressure under static or back flow pressure conditions within said valve, and further adapted to allow liquid flow communication from said first chamber through said peripheral outlet;
   (g) a second chamber positioned outside said first chamber;
   (h) at least one outlet opening from said second chamber formed in the periphery thereof;
   (i) a second flexible member mounted at the outer periphery of said second chamber and adapted to seal said peripheral opening through elastic pressure under static or back flow conditions within said valve, and further adapted to allow liquid flow communication between said second chamber and said discharge means through said peripheral opening in said second chamber during forward flow of liquid within said valve;
   (j) an atmospheric vent from said second chamber; and
   (k) a sealing means within said second chamber adapted to engage said first flexible member adapted to seal liquid flow communication from said second chamber to said atmospheric vent upon forward flow of liquid from said first chamber to said second chamber.

2. The preventer valve of claim 1 wherein said first chamber is defined by a truncated cone and said outlet from said first chamber are a plurality of grooves in said cone.

3. The preventer valve of claim 2 wherein said second chamber is bounded by the interior of a second truncated cone and the exterior of said first cone and said outlet in said second chamber is provided by a plurality of grooves in said second cone.

4. The preventer valve of claim 2 wherein said second flexible member is an elastomeric sleeve.

5. The preventer valve of claim 4 wherein said second elastomeric sleeve is constructed of a rubber having a durometer hardness of 30 to 100.

6. The preventer valve of claim 5 wherein said hardness is 35 to 50.

7. The preventer valve of claim 1 wherein said first flexible member is elastomeric.

8. The preventer valve of claim 7 wherein said first flexible member is an elastomeric sleeve.

9. The preventer valve of claim 8 wherein said elastomeric sleeve is constructed of a rubber having a durometer hardness of 30 to 100.

10. The preventer valve of claim 9 wherein said hardness is 35 to 50.

11. The preventer valve of claims 1 or 7 wherein said atmospheric vent is provided by a third truncated cone having a plurality of openings within the periphery thereof; said third cone being concentrically interposed between said first cone and said second cone and in sealing communication with an interior surface of said second cone, said exterior of said third cone and a portion of the interior of said second cone defining a third annular chamber in liquid flow communication with said atmospheric vent, wherein said first flexible member engages the interior of said third cone thereby sealing liquid flow communication to said third annular chamber and said atmospheric vent prior to liquid flow communication to said second chamber.

12. The preventer valve of claim 1 wherein said second chamber is a reduced pressure zone.

* * * * *